(12) United States Patent
Benson

(10) Patent No.: US 9,903,229 B2
(45) Date of Patent: Feb. 27, 2018

(54) JOINT ASSEMBLY AND A METHOD OF USING THE SAME

(71) Applicant: ROLLS-ROYCE plc, London (GB)

(72) Inventor: Christopher Benson, Swindon (GB)

(73) Assignee: ROLLS-ROYCE plc, London (GB)

( * ) Notice: Subject to any disclaimer, the term of this patent is extended or adjusted under 35 U.S.C. 154(b) by 330 days.

(21) Appl. No.: 14/955,906

(22) Filed: Dec. 1, 2015

(65) Prior Publication Data

US 2016/0177787 A1 Jun. 23, 2016

(30) Foreign Application Priority Data

Dec. 22, 2014 (GB) .................................. 1422933.0

(51) Int. Cl.
*F01D 25/24* (2006.01)
*F16B 5/00* (2006.01)
*F16L 37/14* (2006.01)

(52) U.S. Cl.
CPC .......... *F01D 25/243* (2013.01); *F16B 5/0004* (2013.01); *F05D 2220/32* (2013.01);
(Continued)

(58) Field of Classification Search
CPC ........ F01D 25/243; F16B 3/04; F16B 5/0004; F16B 21/07; F16B 21/18; F16B 21/183; F16B 21/084
See application file for complete search history.

(56) References Cited

U.S. PATENT DOCUMENTS 1,899,343 A * 2/1933 Mackey ................. B01D 39/06
16/DIG. 42
2,839,218 A * 6/1958 Zerbe ......................... B01J 3/03
220/240

(Continued)

FOREIGN PATENT DOCUMENTS

DE 946 580 C 8/1956
DE 2 310 375 A1 9/1974
(Continued)

OTHER PUBLICATIONS

Mar. 26, 2015 Search Report issued in British Patent Application No. 1422933.0.
(Continued)

*Primary Examiner* — Jonathan P Masinick
(74) *Attorney, Agent, or Firm* — Oliff PLC

(57) ABSTRACT

A joint assembly has first to third end portions of first to third components and an elongate resilient connection member. The first end portion interconnects with the second in a castellated arrangement. The first and second end portions have repeating arrays of first and second, and third and fourth connection portions. The first connection portion is received inward the third, and its first location feature being aligned with a third location feature of the third forming a first cavity portion, and the second connection portion axially distal surface abutting against that of the fourth, with a second location feature of the second connection portion being aligned with a fourth location feature of the fourth connection portion forming a second cavity portion. The first and second cavity portions are aligned forming an annular cavity, with the connection member being receivable within the annular cavity interlocking the first component to the second.

10 Claims, 3 Drawing Sheets

(52) U.S. Cl.
CPC ...... *F05D 2230/60* (2013.01); *F05D 2260/36* (2013.01); *F05D 2300/501* (2013.01); *F16L 37/148* (2013.01); *Y02T 50/672* (2013.01)

(56) References Cited

U.S. PATENT DOCUMENTS

| | | | | |
|---|---|---|---|---|
| 3,039,649 | A | | 6/1962 | Aleck |
| 3,339,832 | A | * | 9/1967 | Duecker ............... F01D 17/162 |
| | | | | 285/301 |
| 4,192,225 | A | * | 3/1980 | Moyer ...................... F16B 3/04 |
| | | | | 285/321 |
| 4,771,678 | A | * | 9/1988 | Walker .................. F01L 329/00 |
| | | | | 403/377 |
| 5,219,190 | A | * | 6/1993 | Grammel, Jr. ............ F02K 1/04 |
| | | | | 285/276 |
| 5,286,135 | A | * | 2/1994 | James ....................... F16B 3/04 |
| | | | | 403/319 |
| 5,357,847 | A | * | 10/1994 | Stewart ..................... F16B 3/04 |
| | | | | 220/319 |
| 8,794,916 | B2 | * | 8/2014 | Ura ......................... F01D 11/08 |
| | | | | 415/213.1 |

FOREIGN PATENT DOCUMENTS

| | | | | |
|---|---|---|---|---|
| DE | 2811375 | A1 | * 9/1979 | ........... E04B 1/5837 |
| DE | 10 2007 049 550 | A1 | 4/2009 | |
| EP | 3 438 296 | A2 | 7/1991 | |
| EP | 2 620 652 | A1 | 7/2013 | |
| EP | 2740945 | A2 | 6/2014 | |
| FR | 2044144 | A5 | * 2/1971 | ................ F16B 3/04 |
| WO | WO-9623684 | A1 | * 8/1996 | ............... B60T 11/16 |
| WO | 2014/142837 | A1 | 9/2014 | |

OTHER PUBLICATIONS

May 19, 2016 Search Report issued in European Patent Application No. 15 19 7172.

* cited by examiner

JOINT ASSEMBLY AND A METHOD OF USING THE SAME

This disclosure claims the benefit of UK Patent Application No. GB 1422933.0, filed on 22 Dec. 2014, which is hereby incorporated herein in its entirety.

FIELD OF THE DISCLOSURE

The present disclosure relates to a joint assembly and particularly, but not exclusively, to a joint assembly for locking two components together, together with a method of using such a joint assembly.

BACKGROUND TO THE DISCLOSURE

It is known to use a wired joint to lock two cylindrical components to one another. Such an arrangement uses a wire having a round (shown in FIGS. 1 and 2) cross section which is inserted into an annular cavity between the two components through a slot in the outer surface of the assembled components.

In order to ensure that the assembled components are held securely together, it is necessary for the wire to be a close fit in the annular cavity. The frictional forces resulting from this close fit make insertion, and particularly removal, of the wire difficult. This in turn renders this joint arrangement impractical for applications, such as gas turbine engines, where a cylindrical joint needs to be made and broken for maintenance and repair without having to apply undue force.

Most gas turbine engines employ conventional nut and bolt configurations to secure together the main structural engine components, such as fan and body casing parts. The temperature of gases passing through the engine can range between approximately 700° C. and approximately 2500° C. which can cause thermal cycling problems. As the engine temperature varies through such a temperature range, bolts tend to gall and seize. This can require the bolts to be drilled out during the disassembly of the engine, which is expensive and time-consuming. In addition, the use of nuts and bolts requires the use of corresponding flanges on the parts to be joined, which adds to weight and increases assembly time. Furthermore, in some arrangements, bolts heads are positioned in the gas flow path which may disrupt the aerodynamics of the engine and may accelerate the deterioration of the bolt.

The joint assembly of the present disclosure eliminates the requirement for a nut and bolt configuration and so reduces weight, speeds assembly and repair, minimises aerodynamic disruption in the flow path through the assembled components is simpler and less expensive than a conventional joint assembly, and reduces the high stress concentrations and bending loads associated with a bolted flanged joint.

STATEMENTS OF DISCLOSURE

According to a first aspect of the present disclosure there is provided a joint assembly comprising:
a first end portion of a first hollow component;
a second end portion of a second hollow component; and
an elongate resilient connection member,
wherein the first end portion interconnects with the second end portion in a castellated arrangement, the castellated arrangement extending circumferentially around a periphery of the joint assembly, the first end portion comprising a repeating array of first connection portions and second connection portions,
each first connection portion comprising a first location feature on an outwardly facing surface of the first end portion, and each second connection portion comprising a second location feature on an axially distally facing surface of the first end portion,
the second end portion comprising a repeating array of third connection portions and fourth connection portions,
each third connection portion comprising a third location feature on an inwardly facing surface of the second end portion, and each fourth connection portion comprising a fourth location feature on an axially distally facing surface of the second end portion,
the first connection portion being slidably received inwardly of the third connection portion, with the first location feature being aligned with the third location feature to form a first cavity portion,
the axially distal surface of the second connection portion abutting against the axially distal surface of the fourth connection portion, with the second location feature being aligned with the fourth location feature to form a second cavity portion,
the first cavity portions and the second cavity portions being aligned to form a single annular cavity,
the connection member being receivable within the single annular cavity to interlock the first component to the second component.

The castellated arrangement of the interconnection between the first end portion and the second end portion provides the joint assembly with improved loading carrying abilities when compared to a conventional wired joint. In particular the joint assembly has a greater capacity to handle both in-plane and out-of-plane bending forces than has a conventional wired joint.

This is because the interconnecting first and third connection portions and the interconnecting second and fourth connection portions allow for an efficient transfer of bending loads from the first component to the second component across the joint assembly.

In this way, the joint assembly of the disclosure provides a more weight efficient means of joining a first component to a second component where bending loads are to be transferred across the joint assembly.

Furthermore, the castellated geometry of the joint connection enables the joint assembly to withstand complex load arrangements such as, for example, a combination of shear, bending, tension and/or compression.

These embodiments have the further advantage of limiting the propagation of damage across the joint assembly resulting from the discontinuous arrangement of the castellated sectors.

A further advantage of the castellated arrangement of first and second end portions is that it enables the joint assembly to resist rotational loading applied across the joint.

A still further advantage of the castellated arrangement of first end and second end portions is that it provides an indexing feature to assist a user in the assembly of the joint.

Optionally, each of the outwardly facing surface of the first end portion, and the inwardly facing surface of the second end portion, lie in a plane parallel to an axis of the joint assembly.

This makes the first end portion and the second end portion simpler and more cost effective to manufacture because they can be, for example, surfaces of revolution where the first component and second component are revolute components.

In other arrangements, the outwardly facing surface of the first end portion, and the inwardly facing surface of the second end portion may lie in a plane that is inclined relative to the axis of the joint assembly. Such an arrangement will be more expensive and time-consuming to manufacture than the above-mentioned 'parallel' arrangement.

However, the inclined inwardly and outwardly facing surfaces can allow for more effective load transfer across the joint. For example, the angle of the inclined surfaces may be chosen to align with a particular applied load so as to generate shear loading across the wired joint.

Optionally, each of the axially distally facing surface of the first end portion, and the axially distally facing surface of the second end portion, lie in a plane normal to an axis of the joint assembly.

The choice of a plane normal to an axis of the joint assembly for each of the axially distally facing surface of the first end portion, and the axially distally facing surface of the second end portion makes these surfaces easier and cheaper to produce than other orientations of these surfaces.

In other arrangements, these axially distally facing surfaces may be oriented at an angle other than normal to an axis of the joint assembly. For example, they may be oriented such that they lie in the plane of an applied load. This allows the applied load to be transferred across the wired joint in shear; this being the most efficient load transfer arrangement for a wired joint.

Optionally, the castellated arrangement extends partially around the periphery of the joint assembly.

In one embodiment, the castellated arrangement extends around only a part of the circumference of the joint assembly. Such a design may provide for a more weight efficient solution where there is a single localised loading applied to the assembly of first and second components. This embodiment, requiring fewer castellations, makes the joint assembly cheaper to manufacture, and easier to assembly since a fewer quantity of castellations must be aligned when assembling the joint.

In another embodiment, the castellated arrangement extends in discrete sectors around the circumference of the joint. The sector angle can be chosen based upon the load case imposed on the joint assembly. This embodiment also provides for a lower weight joint assembly than one in which the castellations extend continuously around the circumference of the joint assembly.

Optionally, a peripheral length of the interconnecting first and second connection portions is equal to a peripheral length of the third and fourth connection portions.

In other words, each of the interconnecting first and third connection portions has an equal circumferential length to a circumferential length of each of the interconnecting second and fourth connection portions.

An advantage of this feature is that the castellated arrangement is circumferentially symmetrical, which makes the joint assembly easier and more convenient for a user to assemble.

Optionally, the connection member is helical.

The use of a helical connection member makes the joint assembly easier to assemble and dismantle because its outer diameter can be reduced on assembly and dismantling by stretching or twisting the connection member along its length.

Optionally, for each first connection portion and corresponding third end portion, an axial overlap length between the first connection portion and the corresponding third connection portion is approximately four to eight times the radial cross-sectional diameter of the annular cavity.

The axial overlap between the first end portion and the second end portion provides the joint assembly with capacity to withstand in-plane bending loads applied across the joint assembly.

Optionally, for each second connection portion and corresponding fourth connection portion, each of a radial length of the axially distal surface of the second connection portion, and a radial length of the axially distal surface of the corresponding fourth connection portion, is approximately two to five times the radial cross-sectional diameter of the annular cavity The radial length of the axially distal surfaces of the second connection portion and corresponding fourth connection portion provides the joint assembly with capacity to withstand in-plane bending loads applied across the joint assembly.

According to a second aspect of the disclosure, there is provided a gas turbine engine fan casing comprising a joint assembly according to a first aspect of the invention.

In other arrangements, the joint assembly of the disclosure may be applied to other containment or casing structures.

According to a third aspect of the disclosure, there is provided a method of joining two components using a joint assembly, the joint assembly comprising a first end portion of a first component, a second end portion of a second component, and an elongate, resilient, connection member, the first end portion interconnecting with the second end portion in a castellated arrangement, the first end portion comprising a repeating array of first connection portions and second connection portions, and the second end portion comprising a repeating array of third connection portions and fourth connection portions, the method comprising the steps of:
  (a) positioning the first end portion of the first component relative to the second end portion of the second component such that corresponding pairs of first and third connection portions, and second and fourth connection portions are aligned with one another;
  (b) interconnecting the first end portion of the first component with the second end portion of the second component, such that each pair of aligned first and third connection portions form a first cavity portion, and each pair of aligned second and fourth connection portions form a second cavity portion, each of the first and second cavity portions being aligned to form a single annular cavity; and
  (c) inserting an elongate, resilient connection member into the annular cavity to interlock the first component to the second component Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
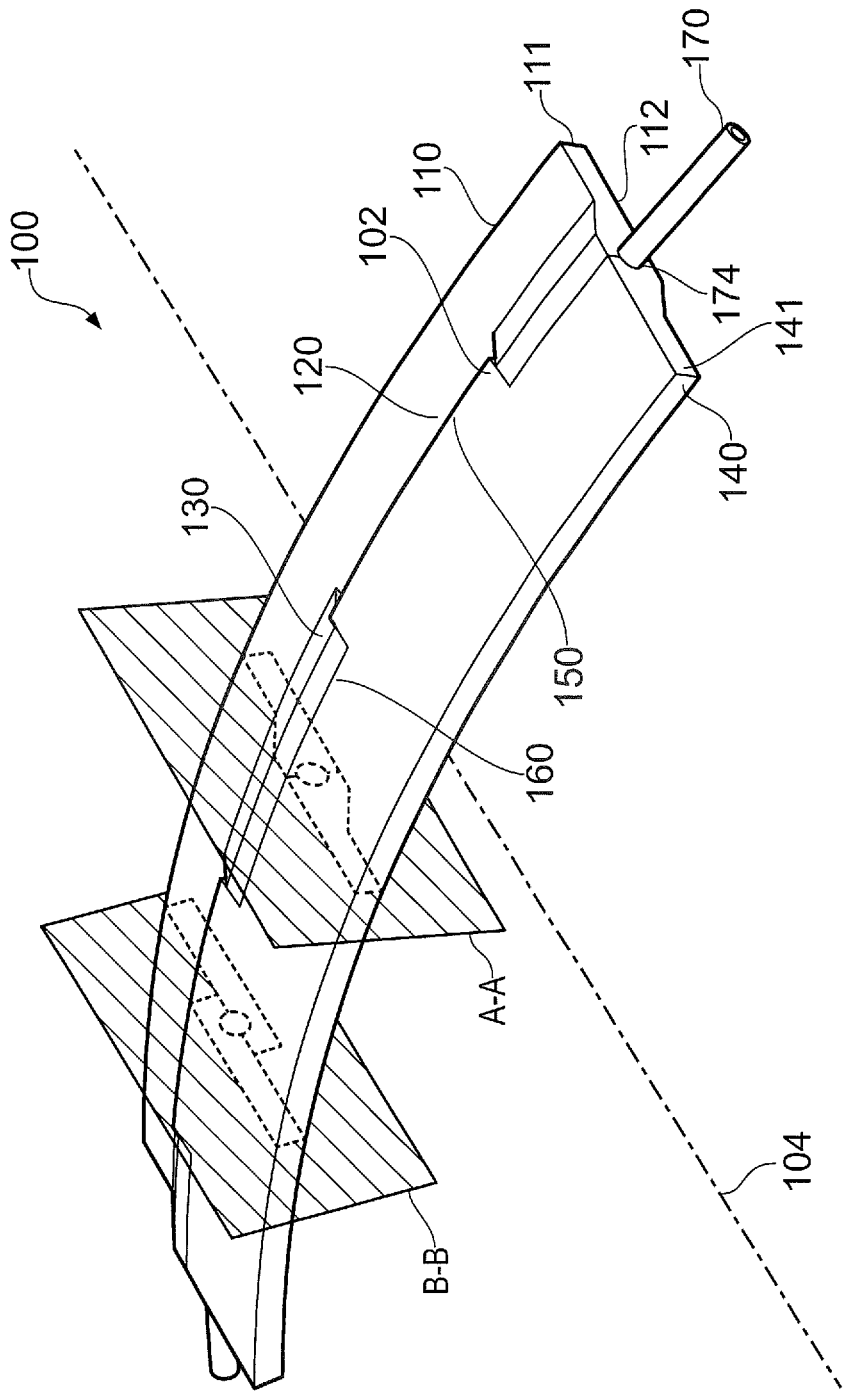
FIG. 1 shows a partial perspective view of a joint assembly according to a first embodiment of the present disclosure.
Figure 2:
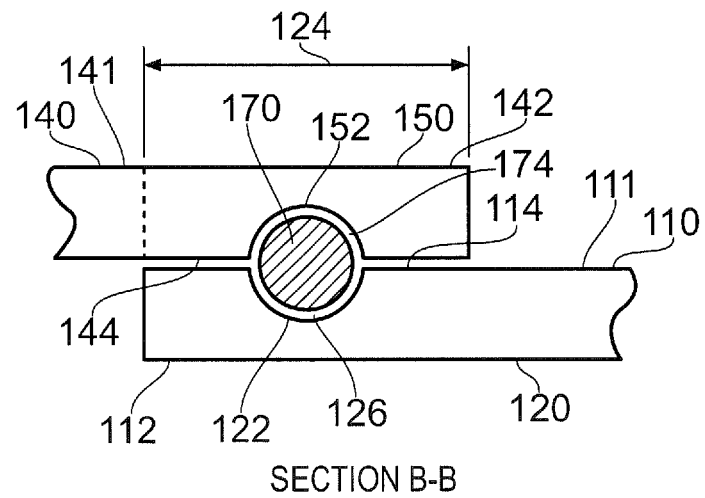
FIG. 2 shows a partial sectional view of the interconnected first and third connection portions of the joint assembly of FIG. 1.
Figure 3:
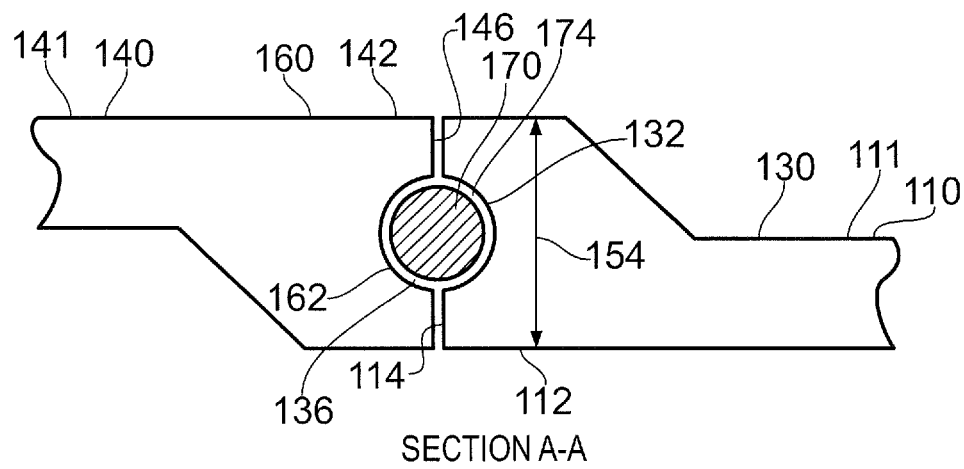
FIG. 3 shows a partial sectional view of the interconnected second and fourth connection portions of the joint assembly of FIG. 1.

Referring to FIGS. 1 to 3, a joint assembly according to an embodiment of the disclosure is designated generally by the reference numeral 100. The joint assembly 100 comprises an annular first end portion 112 of a first component 110, an annular second end portion 142 of a second component 140 and an elongate resilient connection member 170. The joint assembly 100 has an axis of revolution 104.

In the embodiment shown in the figures, the first component 110 and the second component 140 form part of a fan casing (not shown) of an aircraft turbofan engine (also not shown). In this arrangement, each of the first component 110 and the second component 140 is formed as a revolute component. In other arrangements, the first component 110 and the second component 140 may have an alternate cross-sectional geometry such as, for example, an elliptical geometry.

In the present embodiment, each of the first component 110 and the second component 140 is formed from a titanium alloy forging. In other embodiments the first component 110 and/or the second component 140 may be formed from another material such as a steel, alloy, an aluminium alloy or a fibre-reinforced composite material.

The connection member 170 is formed from helical flat spring steel wire. In other arrangements, the connection member 170 may be formed from spring steel wire having a circular cross-section.

The first end portion 112 interconnects with the second end portion 142 in a castellated arrangement, with the castellated arrangement extending circumferentially around a periphery 102 of the joint assembly 100. The castellated arrangement extends entirely around the periphery 102 of the joint assembly 100.

The first end portion 112 comprises a repeating array of first connection portions 120 and second connection portions 130. The second end portion 142 comprises a corresponding repeating array of third connection portions 150 and fourth connection portions 160. In the present embodiment, a circumferential length of each of the first connection portions 120 is equal to a circumferential length of each of the second connection portions 130, which in turn is correspondingly equal to a circumferential length of each of the third connection portions 150 and to a circumferential length of each of the fourth connection portions 160.

As shown in FIG. 1, each first connection portion 120 interconnects with a corresponding third connection portion 150, and each second connection portion 130 interconnects with a corresponding fourth connection portion 160.

Each first connection portion 120 comprises a first location feature 122 on a radially outwardly facing surface 114 of the first end portion 112. Each second connection portion 130 comprises a second location feature 132 on an axially distally facing surface 116 of the first end portion 112.

The first location feature 122 is formed as a curved hemispherical groove on the radially outwardly facing surface 114 of the first end portion 112. The second location feature 132 is formed as a curved hemispherical groove on the axially distally facing surface 116 of the first end portion 112.

Each third connection portion 150 comprising a third location feature 152 on a radially inwardly facing surface 144 of the second end portion 142, and each fourth connection portion 160 comprising a fourth location feature 162 on an axially distally facing surface 146 of the second end portion 142.

The third location feature 132 is formed as a curved hemispherical groove on the radially inwardly facing surface 144 of the second end portion 142. The fourth location feature 162 is formed as a curved hemispherical groove on the axially distally facing surface 146 of the second end portion 142.

In this embodiment, each of the radially outwardly facing surface 114 and the radially inwardly facing surface 144 lie in a circumferential plane that is parallel to an axis 104 of the joint assembly 100. In this embodiment, each of the axially distal surface 116 and the axially distal surface 146 lie in a plane normal to an axis 104 of the joint assembly 100

In the embodiment shown in FIGS. 2 and 3, the first component 110 has a first wall portion 111 having a thickness of 5 mm. This wall thickness is maintained across the axial extent of the first end portion 112. Similarly, the second component 140 has a second wall portion 141 having a thickness of 5 mm. An axial overlap 124 between each first connection portion 120 and the corresponding third connection portion 150 is 30 mm.

At the second connection portion 130, the thickness of the first end portion 112 increases from that of the first wall portion 111 (i.e. 5 mm in the present embodiment) to 15 mm at the second connection portion 130. Correspondingly, at the fourth connection portion 160 the thickness of the second end portion 142 increases from that of the second wall portion 111 (i.e. 5 mm in the present embodiment) to a radial length 154 having a value of 15 mm at the fourth connection portion 130.

In other arrangements, the thickness of the first and second wall portions, and the first and second end portions, together with the axial and radial overlaps may take alternative values dependent upon loading and structural constraints.

In use, the first end portion 110 of the first component 110 is positioned relative to the second end portion 142 of the second component 140 such that corresponding pairs of first and third connection portions 120,150, and second and fourth connection portions 130, 160 are aligned with one another.

The first connection portion 120 is slidably received radially inwardly of the third connection portion 150, with the first location feature 122 being aligned with the third location feature 152 to form a first cavity portion 126.

The axially distal surface 116 of the second connection portion 130 abuts against the axially distal surface 146 of the fourth connection portion 160, with the second location feature 132 being aligned with the fourth location feature 162 to form a second cavity portion 136.

Each of the first cavity portions 126 and the second cavity portions 136 are circumferentially aligned to form a single annular cavity 174.

The connection member is receivable within the single annular cavity 174 to interlock the first component 110 to the second component 140.

Figure 4:
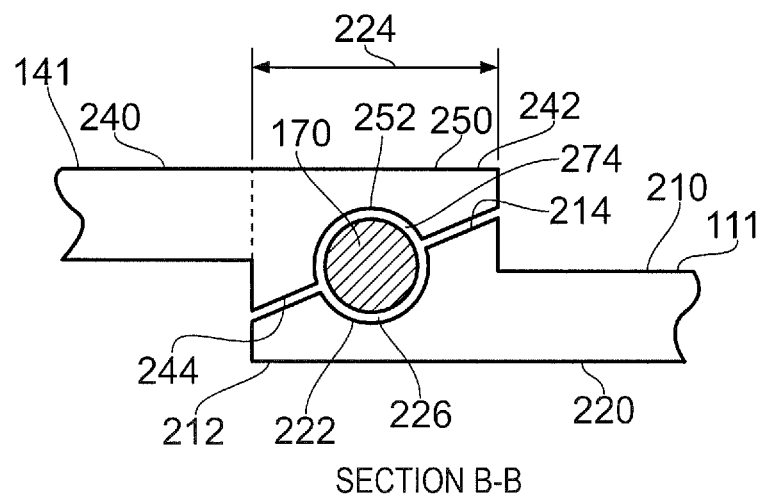
FIG. 4 shows a partial sectional view of the interconnected first and third connection portions of a joint assembly according to a second embodiment of the invention.
Figure 5:
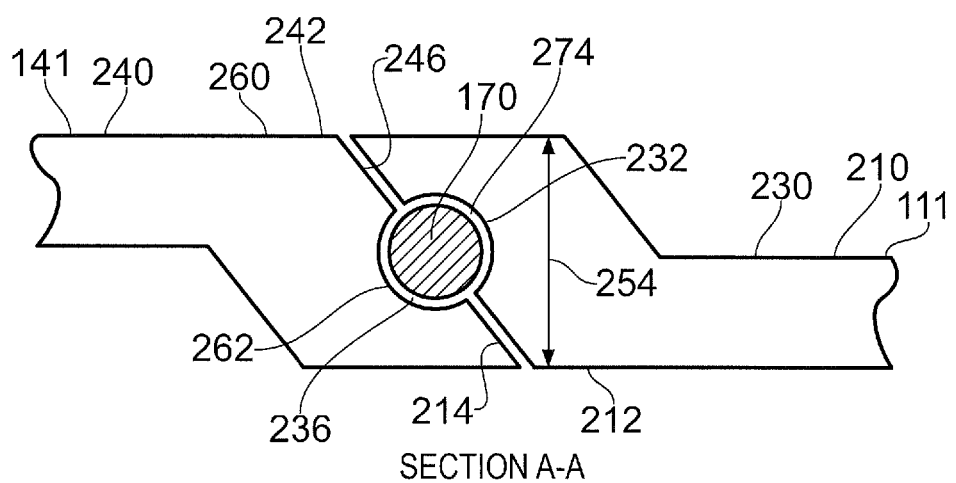
FIG. 5 shows a partial sectional view of the interconnected second and fourth connection portions of the second embodiment of the joint assembly.

Referring to FIGS. 4 and 5, a joint assembly according to a second embodiment of the disclosure is designated generally by the reference numeral 200. Features of the joint assembly 200 which correspond to those of the joint assembly 100 have been given corresponding reference numerals for ease of reference.

The joint assembly 200 comprises an annular first end portion 212 of a first component 210, an annular second end portion 242 of a second component 240 and an elongate resilient connection member 170.

The first end portion 212 interconnects with the second end portion 242 in the same castellated arrangement as that described above in respect of the first embodiment.

Each first connection portion 220 comprises a first location feature 222 on a radially outwardly facing surface 214 of the first end portion 212. Each second connection portion 230 comprises a second location feature 232 on an axially distally facing surface 216 of the first end portion 212.

Each third connection portion 250 comprising a third location feature 252 on a radially inwardly facing surface 244 of the second end portion 242, and each fourth connection portion 260 comprising a fourth location feature 262 on an axially distally facing surface 246 of the second end portion 242.

In this embodiment, each of the radially outwardly facing surface 214 and the radially inwardly facing surface 244 lie in a circumferential plane that is inclined at an acute angle to an axis 104 of the joint assembly 200. The inclination of the circumferential plane may be selected dependent upon the applied loading to which the joint assembly 200 is to be subjected.

In this embodiment, each of the axially distal surface 216 and the axially distal surface 246 are inclined at an acute angle to a plane normal to an axis 104 of the joint assembly 200. The selection of the angle of inclination of the axially distal surfaces 216,246 may be dependent upon the applied loading to which the joint assembly 200 is to be subjected.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

The invention claimed is:

1. A joint assembly comprising:
a first end portion of a first hollow component;
a second end portion of a second hollow component; and
an elongate resilient connection member,
wherein the first end portion interconnects with the second end portion in a castellated arrangement,
the castellated arrangement extending around a periphery of the joint assembly,
the first end portion comprising a repeating array of first connection portions and second connection portions,
each first connection portion comprising a first location feature on an outwardly facing surface of the first end portion, and each second connection portion comprising a second location feature on an axially distally facing surface of the first end portion,
the second end portion comprising a repeating array of third connection portions and fourth connection portions,
each third connection portion comprising a third location feature on an inwardly facing surface of the second end portion, and each fourth connection portion comprising a fourth location feature on an axially distally facing surface of the second end portion,
the first connection portion being slidably received inwardly of the third connection portion, with the first location feature being aligned with the third location feature to form a first cavity portion,
the axially distal surface of the second connection portion abutting against the axially distal surface of the fourth connection portion, with the second location feature being aligned with the fourth location feature to form a second cavity portion,
the first cavity portions and the second cavity portions being aligned to form a single annular cavity,
the connection member being receivable within the single annular cavity to interlock the first component to the second component.

2. The joint assembly as claimed in claim 1, wherein each of the outwardly facing surface of the first end portion, and the inwardly facing surface of the second end portion, lie in a plane parallel to an axis of the joint assembly.

3. The joint assembly as claimed in claim 1, wherein each of the axially distally facing surface of the first end portion, and the axially distally facing surface of the second end portion, lie in a plane normal to an axis of the joint assembly.

4. The joint assembly as claimed in claim 1, wherein the castellated arrangement extends partially around the periphery of the joint assembly.

5. The joint assembly as claimed in claim 1, wherein a peripheral length of the interconnecting first and second connection portions is equal to a peripheral length of the third and fourth connection portions.

6. The joint assembly as claimed in claim 1, wherein the connection member is helical.

7. The joint assembly as claimed in claim 1, wherein for each first connection portion and corresponding third connection portion, an axial overlap length between the first connection portion and the corresponding third connection portion is approximately four to eight times a radial cross-sectional diameter of the annular cavity.

8. The joint assembly as claimed in claim 1, wherein for each second connection portion and corresponding fourth connection portion, each of a radial length of the axially distal surface of the second connection portion, and a radial length of the axially distal surface of the corresponding fourth connection portion, is approximately two to five times a radial cross-sectional diameter of the annular cavity.

9. A gas turbine engine fan casing comprising a joint assembly as claimed in claim 1.

10. A method of joining two components using a joint assembly, the joint assembly comprising a first end portion of a first component, a second end portion of a second component, and an elongate, resilient, connection member, the first end portion interconnecting with the second end portion in a castellated arrangement, the first end portion comprising a repeating array of first connection portions and second connection portions, and the second end portion comprising a repeating array of third connection portions and fourth connection portions, the method comprising the steps of:
(a) positioning the first end portion of the first component relative to the second end portion of the second component such that corresponding pairs of first and third connection portions, and second and fourth connection portions are aligned with one another;
(b) interconnecting the first end portion of the first component with the second end portion of the second component, such that each pair of aligned first and third connection portions form a first cavity portion, and each pair of aligned second and fourth connection portions form a second cavity portion, each of the first and second cavity portions being aligned to form a single annular cavity; and
(c) inserting an elongate, resilient connection member into the annular cavity to interlock the first component to the second component.

* * * * *